(12) United States Patent
Wei et al.

(10) Patent No.: US 9,803,336 B2
(45) Date of Patent: Oct. 31, 2017

(54) SYSTEM AND METHOD FOR DETERMINING DUMP LOCATIONS

(71) Applicant: Caterpillar Inc., Peoria, IL (US)

(72) Inventors: Mo Wei, Dunlap, IL (US); Michael Taylor, Wexford, PA (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 14/940,814

(22) Filed: Nov. 13, 2015

(65) Prior Publication Data
US 2017/0138016 A1    May 18, 2017

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| E02F 9/20 | (2006.01) |
| G01C 21/20 | (2006.01) |
| E02F 3/84 | (2006.01) |
| E02F 9/26 | (2006.01) |

(52) U.S. Cl.
CPC ........... *E02F 9/2045* (2013.01); *E02F 3/842* (2013.01); *E02F 3/845* (2013.01); *E02F 9/205* (2013.01); *E02F 9/262* (2013.01); *G01C 21/20* (2013.01)

(58) Field of Classification Search
CPC ....... E02F 3/845; E02F 9/2012; E02F 9/2029; E02F 9/205; G01C 21/20
USPC .......................................................... 701/50
See application file for complete search history.

(56) References Cited

U.S. PATENT DOCUMENTS

| | | |
|---|---|---|
| 5,875,854 A | 3/1999 | Yamamoto et al. |
| 6,108,949 A | 8/2000 | Singh et al. |
| 6,823,616 B1 | 11/2004 | Gutter et al. |
| 8,948,981 B2 | 2/2015 | Wei et al. |
| 8,983,738 B2 | 3/2015 | Avitzur et al. |
| 2014/0180444 A1* | 6/2014 | Edara ................... G05D 1/0088 700/56 |

* cited by examiner

*Primary Examiner* — Maceeh Anwari
(74) *Attorney, Agent, or Firm* — Leydig, Voit & Mayer, Ltd.; Timothy A. Parker

(57) ABSTRACT

A system for determining a plurality of dump locations for a blade includes a position sensor and a controller configured to determine the position of a work surface and determine a plurality of dump locations along a path between a start location and an end location based upon the position of the work surface and a desired target. Adjacent pairs of dump locations define a load spacing distance and each load spacing distance is sequentially longer along the work surface closer to the start location.

20 Claims, 5 Drawing Sheets

SYSTEM AND METHOD FOR DETERMINING DUMP LOCATIONS

TECHNICAL FIELD

This disclosure relates generally to controlling a machine and, more particularly, to a system and method for planning a plurality of dump locations of a work implement to optimize subsequent material moving operations.

BACKGROUND

Machines such as dozers, motor graders, wheel loaders, etc., are used to perform a variety of tasks. For example, these machines may be used to move material at a work site. The machines may operate in an autonomous or semi-autonomous manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

In some operations such as mining, it is desirable to move material from one location to another, such as to expose a layer of material to be mined. When these material moving operations are performed by machines such as dozers, the material is moved as a plurality of layers with each layer being stack or laid upon the previously formed layer. The layer creation process may be inefficient and uneven layers may result in efficient and unsteady movement over the previously formed layers.

U.S. Pat. No. 6,108,949 discloses a planning system for an earthmoving operation that uses three levels of processing. The planning system uses the geometry of the work site to determine an optimum excavation operation for a particular machine. The optimum excavation operation may be determined based upon a performance criteria, such as a volume of material excavated, energy expended, and time.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for determining a plurality of dump locations for a blade of a machine as the machine moves on a work surface along a path includes a position sensor for generating position signals indicative of a position of the work surface and a controller. The controller is configured to store a start location of the path, store an end location of the path, determine the position of the work surface based upon the position signals, and store a desired target for a subsequent work surface. The controller is further configured to determine a plurality of dump locations along the path between the start location and the end location based upon the position of the work surface and the desired target. Adjacent pairs of dump locations of the blade define a load spacing distance and each load spacing distance is sequentially longer along the work surface closer to the start location.

In another aspect, a controller-implemented method for determining a plurality of dump locations for a blade of a machine as the machine moves on a work surface along a path includes storing a start location of the path, storing an end location of the path, determining a position of the work surface based upon position signals from a position sensor, and storing a desired target for a subsequent work surface. The method further includes determining a plurality of dump locations along the path between the start location and the end location based upon the position of the work surface and the desired target. Adjacent pairs of dump locations define a load spacing distance with each load spacing distance being sequentially longer along the work surface closer to the start location.

In still another aspect, a machine includes a prime mover, a blade for engaging a work surface along a path, and a position sensor for generating position signals indicative of a position of the work surface. A controller is configured to store a start location of the path, store an end location of the path, determine the position of the work surface based upon the position signals, and store a desired target for a subsequent work surface. The controller is further configured to determine a plurality of dump locations along the path between the start location and the end location based upon the position of the work surface and the desired target. Adjacent pairs of dump locations define a load spacing distance and each load spacing distance is sequentially longer along the work surface closer to the start location.

DETAILED DESCRIPTION

Figure 1:
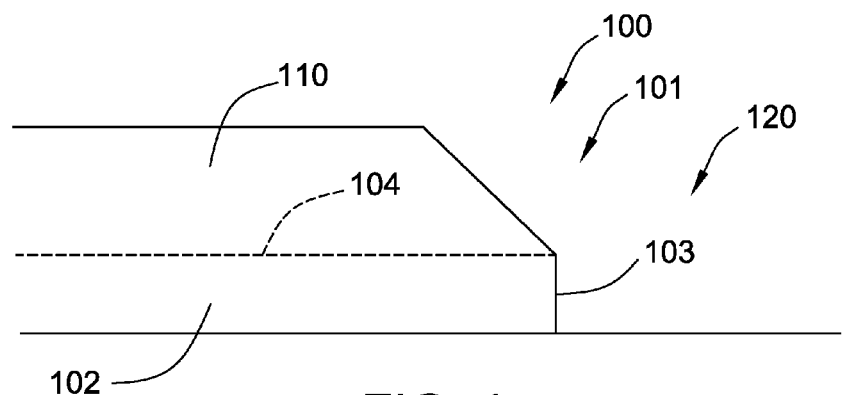
FIG. 1 depicts a diagrammatic cross-section of a portion of a work site with upper and lower layers of material illustrated.

FIG. 1 depicts a diagrammatic illustration of a portion 101 of a work site 100 which one or more machines may operate in an autonomous, a semi-autonomous, or a manual manner. Work site 100 is depicted as a mining site with lower layer 102 of material to be mined such as coal and an upper layer 110 of material such as topsoil that covers the lower layer.

Figure 2:
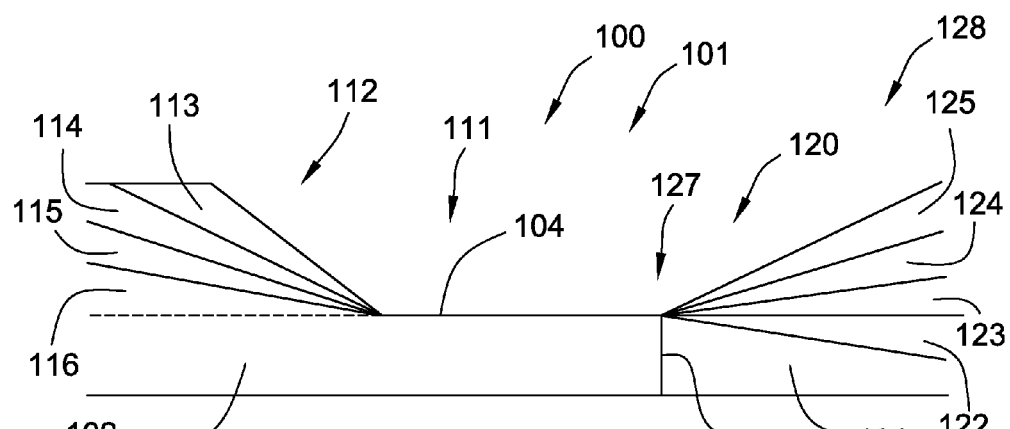
FIG. 2 depicts a diagrammatic cross-section of the portion of the work site of FIG. 1 but with some of the upper layer moved to a position to the side of the lower layer.
Figure 3:
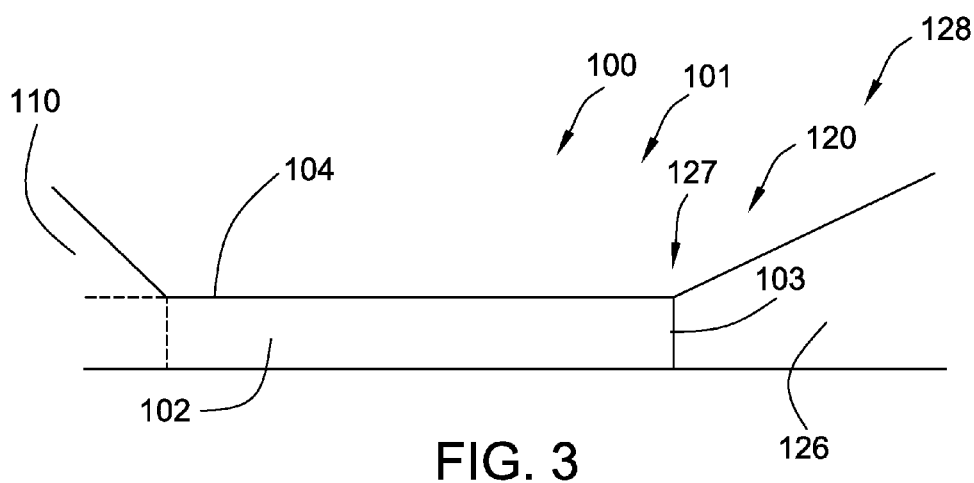
FIG. 3 depicts a diagrammatic cross-section of the portion of the work site of FIG. 1 with all of the upper layer moved to a position to the side of the lower layer.

In FIG. 1, a portion of the lower layer 102 and the upper layer 110 has been removed to leave an open area 120 (to the right of the edge 103 of the lower layer 102 in FIGS. 1-3). Open area 120 includes a start location 127 and an end location 128. The start location 127 may be adjacent the edge 103 of the lower layer 102 while the end location 128 may be defined by a portion of a previously formed pile 126 of material.

In instances in which machines such as a rope shovel (not shown) are not available, machines 10 such as dozers (FIG. 4) may be used to move the upper layer 110 of material so that the lower layer 102 is exposed for subsequent mining. To do so, the machines may move the upper layer 110 of material into the open area 120 by moving a series of relatively small layers or sections of material into the open area. The exposed lower layer 102 may then be removed to form a new open area 120 that is subsequently filled to expose an additional portion of the lower layer 102 and the cycle repeated. As used herein, a layer may refer to a layer or a section of material having a uniform or non-uniform (e.g., triangular) thickness or cross-section.

Referring to FIG. 2, the portion 101 of work site 100 is depicted after material from area 111 was moved to expose a portion of the lower layer 102 and the material from area 111 used to fill a portion 121 of the open area 120. It should be noted that the area 111 and the portion 121 of the open area 120 are not to scale. The remaining material of upper layer 110 to be moved to the open area 120 is depicted generally at 112 and is configured as a plurality of the small layers depicted as 113-116.

More specifically, layer 113 of the remaining material 112 of upper layer 110 is moved to the open area 120 and forms the layer 122. Layer 114 of the remaining material 112 beneath layer 113 is moved to the open area 120 and forms layer 123 above the layer 122. Similarly, layer 115 beneath layer 114 and layer 116 beneath layer 115 are moved to the open area 120 and form layer 124 and layer 125, respectively. As may be understood, the upper layer 110 may be removed in any number of layers until a desired amount of the lower layer 102 of material to be mined is fully exposed and the material from the upper layer is re-relocated at the formerly open area as a pile 126 of material as depicted in FIG. 3. Although depicted as being planar, the lines (and thus the work surfaces) that form layers 113-116 and layers 122-125 may not be planar (e.g., uneven, arcuate) as a result of the material moving processes, the capabilities of the machine 10, and/or the characteristics of the material being moved.

Figure 4:
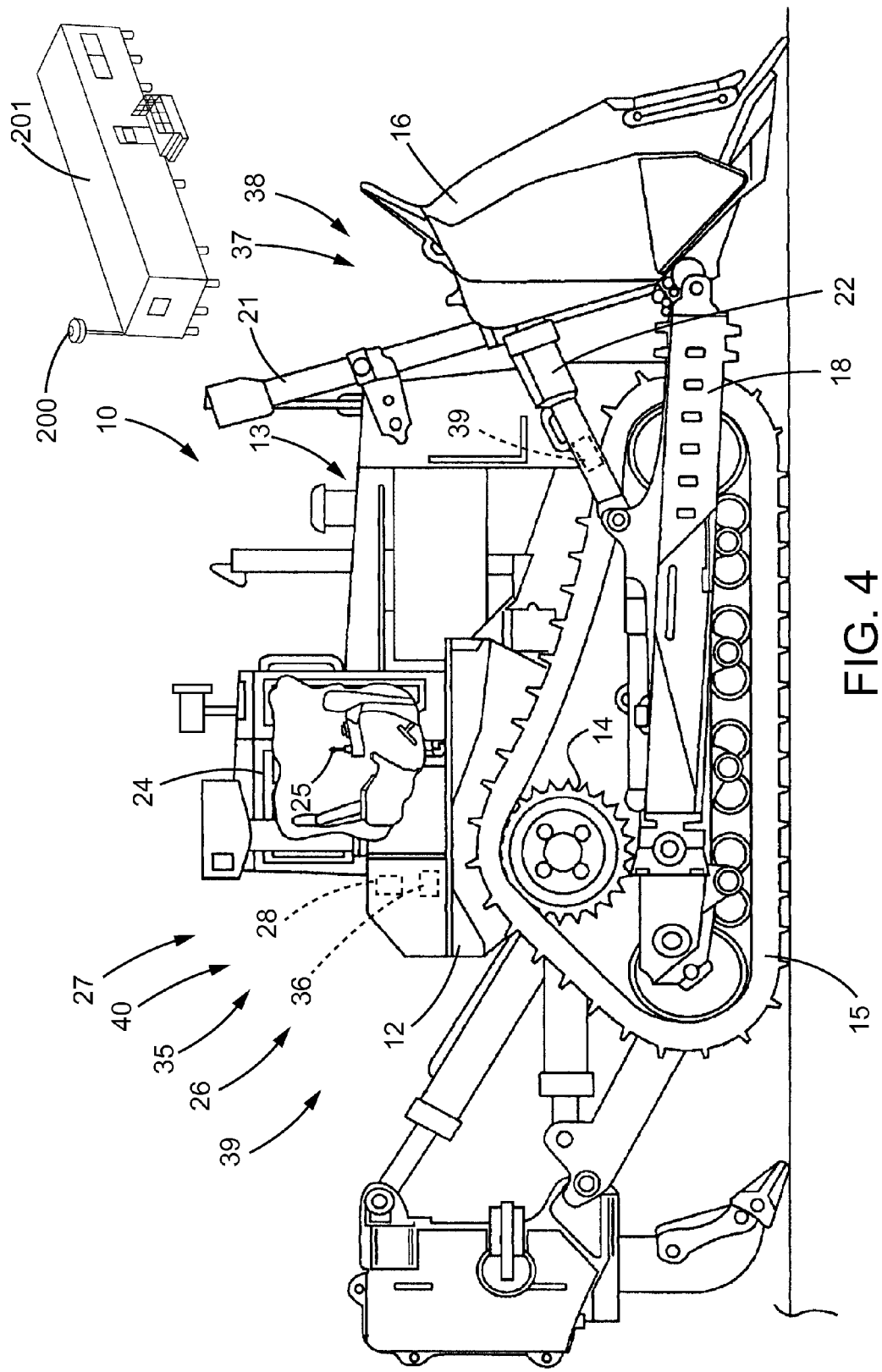
FIG. 4 depicts a diagrammatic illustration of a machine in accordance with the disclosure.

FIG. 4 depicts a diagrammatic illustration of a machine 10 such as a dozer with a ground engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Engine 13 and a transmission (not shown) are operatively connected to the drive sprockets 14, which drive tracks 15. The systems and methods of the disclosure may be used with any machine propulsion and drivetrain mechanisms applicable in the art for causing movement of the machine including hydrostatic, electric, or mechanical drives.

Blade 16 may be pivotally connected to frame 12 by arms 18 on each side of machine 10. First hydraulic cylinder 21 and second hydraulic cylinders 22 facilitate movement of the blade 16 relative to frame 12.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 4 indicating association with the machine 10. The control system 35 may include an electronic control module or controller 36 and a plurality of sensors. The controller 36 may receive input signals from an operator operating the machine 10 from within cab 24 or off-board the machine through a wireless communications system 200. The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 201. The functionality of control system 35 may be distributed so that certain functions are performed at machine 10 and other functions are performed remotely. In such case, the control system 35 may include a communications system such as wireless communications system 200 for transmitting signals between the machine 10 and a system located remote from the machine.

Machine 10 may be configured to be operated autonomously, semi-autonomously, or manually. When operating semi-autonomously or manually, the machine 10 may be operated by remote control and/or by an operator physically located within the cab 24.

Machine 10 may be equipped with a plurality of machine sensors 26, as shown generally by an arrow in FIG. 4 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 4 indicating association with the machine 10, may include a position sensor 28, also shown generally by an arrow in FIG. 4 to indicate association with the machine, to sense the position and orientation (i.e., the heading, pitch, roll or tilt, and yaw) of the machine relative to the work site 100. The position sensor 28 may include a plurality of individual sensors that cooperate to generate and provide position signals to controller 36 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensors 28 to determine the position of the machine 10 within work site 100. In other examples, the position sensor 28 may include a perception based system, or may use other systems such as lasers, sonar, or radar to determine all or some aspects of the position of machine 10.

The position sensing system 27 may also be used to determine a ground speed of machine 10. Other sensors or a dedicated ground speed sensor may alternatively be used to determine the ground speed of the machine 10. In addition, the position sensing system 27 may also be used to determine the position of the work surface upon which the machine 10 is moving. More specifically, based upon known dimensions of the machine 10 and the position of the machine at the work site 100, the position of the work surface may also be determined. As a result, the position sensing system 27 may operate as either or both of a machine position sensing system and a work surface position sensing system. Similarly, the position sensor 28 may operate as either or both of a machine position sensor and a work surface position sensor. Other sensors or a dedicated work surface position sensor may alternatively be used to determine the position of the work surface.

The control system 35 may include an implement load monitoring system 37 shown generally by an arrow in FIG. 4. The implement load monitoring system 37 may include a variety of different types of implement load sensors depicted generally by an arrow in FIG. 4 as an implement load sensor system 38 to measure the load on the blade 16. In one embodiment, the implement load sensor system 38 may embody one or more pressure sensors 39 for use with one or more hydraulic cylinders, such as second hydraulic cylinders 22, associated with blade 16. Signals from the pressure sensor 39 indicative of the pressure within the second hydraulic cylinders 22 may be monitored by controller 36. From the load on the blade 16, the controller 36 may determine the amount or volume of material being moved by the blade.

The load on the blade 16 may be affected by the slope of the terrain upon which the machine 10 is moving. Accordingly, if desired, the accuracy of the implement load measurement may be increased by utilizing the implement load sensor system 38 in conjunction with a slope or inclination sensor such as a pitch angle sensor indicated generally at 39. For example, if the machine 10 is moving uphill, the load on the blade 16 may be higher due to gravity as compared to a machine operating in the same conditions on flat terrain. Similarly, the load on the blade 16 may be lower for the same mass or volume when the machine in moving downhill. By determining the slope of the terrain, the controller 36 may more accurately determine changes in the load on the blade 16.

Machine 10 may be configured to move material at the work site 100 according to one or more material movement plans along a path from an initial location such as from upper layer 110 to a spread or dump location such as open area 120. The material movement plans may include, among other things, forming a plurality of spaced apart channels or slots that are cut into the work surface to assist in moving material from the initial location to the spread on dump location such as open area 120.

As depicted in FIG. 2, in one embodiment, each slot may be formed by removing material from the work surface in one or more layers 113-116 a plurality of loads until a final work surface or final design plane is reached. In one embodiment, the final design plane may correspond to the upper surface 104 of the lower layer 102. More specifically, referring to FIG. 5, the blade 16 of machine 10 may engage the surface along a series of sequential cuts 130, 132, 134, 136 that are spaced apart lengthwise along the slot. Controller 36 may be configured to guide the machine 10 to execute each cut and carry the material along the slot to the spread or dump location.

The material being pushed by the blade 16 is moved to the open area 120 to form a portion of the next layer of pile 126. In doing so, the machine 10 pushes the material onto the upper surface 140 of layer 123 for a desired distance so that the load 143 of material is adjacent the end location 128 of the open area 120. The machine is then moved in reverse to leave the load 143 of material on the upper surface 140 of layer 123. The machine 10 is returned to the initial location and another material moving cycle begun by guiding the machine to execute the next sequential cut 132. The material is moved to the open area 120 to a desired location generally adjacent the previous load 143 of material and the machine is moved in reverse to complete the next material moving cycle. This process is repeated until a desired number of loads of material have been moved onto the upper surface 140 of the currently exposed layer 123 of material.

The upper surfaces 155 of the adjacent loads of material form or define the work or upper surface of the next layer of material deposited at the open area 120. Movement of the machine 10 over the upper surface of material of the previously generated layer as each new load of material is deposited on that layer will help to compact and smooth that layer, which will permit more efficient operation of the machine.

Control system 35 may include a module or planning system 40 for determining or planning various aspects of a material moving plan. In one aspect, the planning system 40 may determine the position at which the machine 10 is reversed during each material movement cycle to define the location of each load of material at the open area 120. To do so, the planning system 40 may receive and store various types of input such as the configuration of the material to be moved which may include the configuration of the work surface adjacent the cutting locations and the final design plane together with the configuration of the open area 120. The configuration of the open area 120 may include the desired configurations of the layers 122-125 of material to be used to fill the open area including the start location 127, the end location 128, and the angle between each of the layers that form a portion of the pile 126 of material. The planning system 40 may also receive and store the characteristics of the material to be moved (e.g., density, moisture content, compactability, angle of repose).

Figure 5:
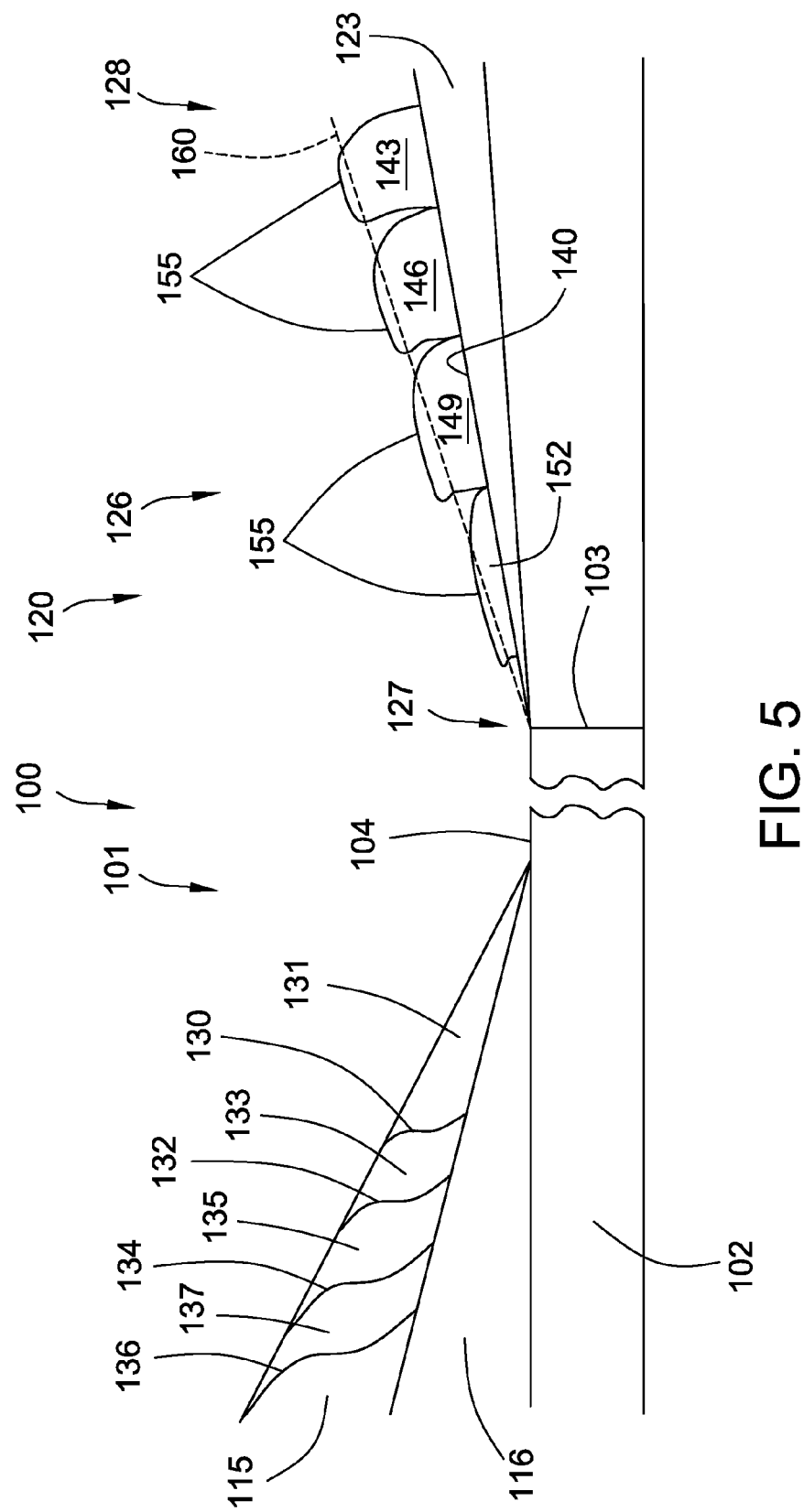
FIG. 5 depicts a diagrammatic cross-section of the portion of the work site of FIG. 1 illustrating the movement of a series of individual loads of material.
Figure 6:
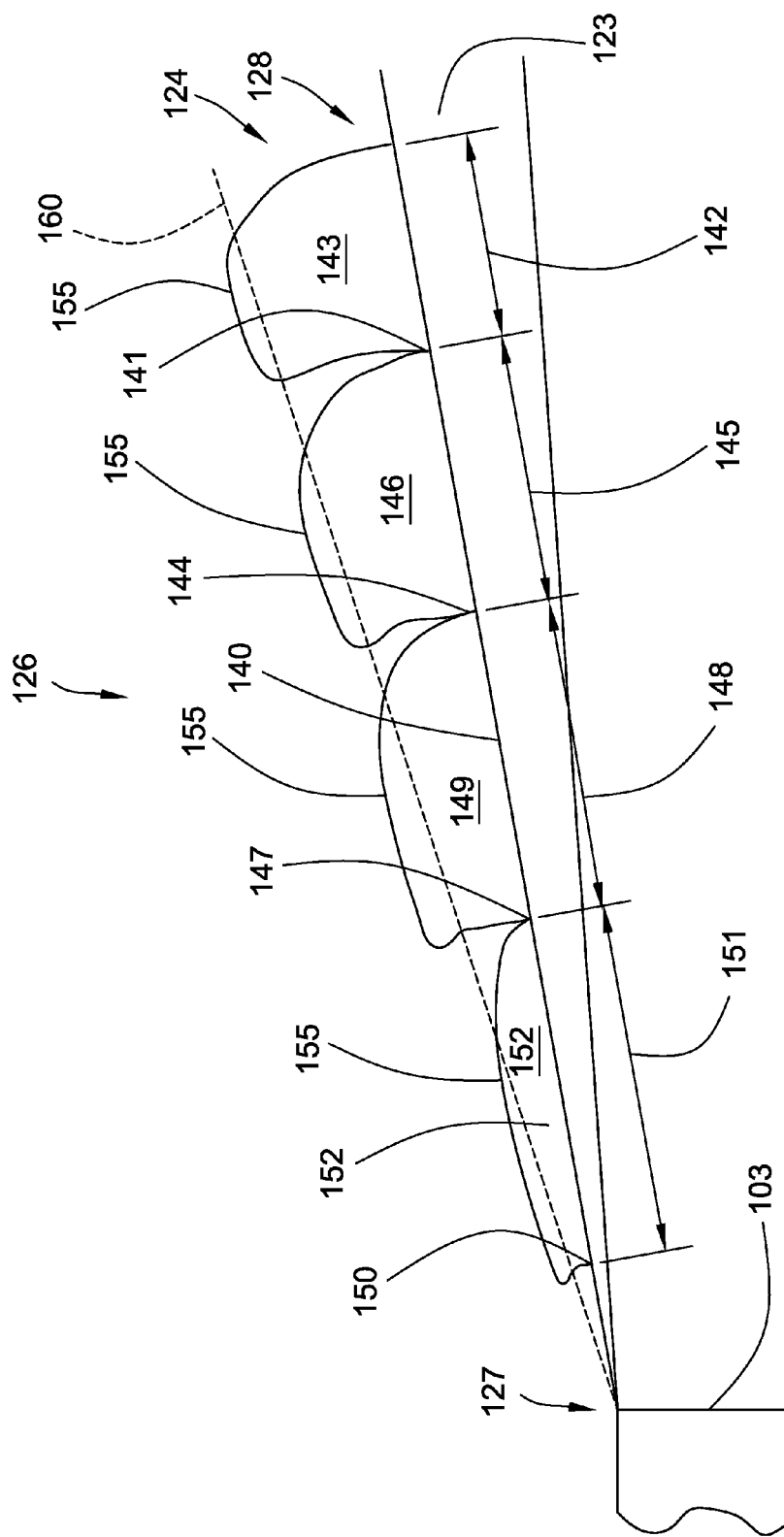
FIG. 6 depicts an enlarged cross-section of a portion of FIG. 5.

Referring to FIGS. 5-6, examples of four material moving cycles are depicted. In practice, each layer that forms the pile 126 of material may be formed by any number (including substantially greater than four) material moving cycles. Although each of layers 113-116 (FIG. 2) is depicted as sloping to the upper surface 104 of the lower layer 102, the layers may have any shape or configuration. However, each of layers 122-125 begins at or generally near start location 127 and expands towards end location 128 so that each layer is shortest or closest to its adjacent layers at start location 127 and tallest or farthest from the adjacent layers at end location 128.

The position of the work or upper surface of each layer upon which material will be deposited at open area 120 may be obtained according to any desired method. In one example, the machine 10 may utilize the position sensing system 27 described above to map out the contour of the work surface as machine 10 moves across it. This data may also be obtained according to other methods such as by a vehicle that includes lasers and/or cameras.

As depicted, a first cut 130 results in a first volume 131 of material being cut from layer 115 of the upper layer 110 of material. The material is pushed along the upper surface 140 of layer 123 until the blade is stopped at first dump location 141, which is a first predetermined distance 142 from the end location 128 of the pile 126 of material. Upon dumping the load of material and reversing the machine 10, the first load 143 of material is left on the upper surface 140 of layer 123. Depending upon the characteristics of the material being moved, the first load 143 of material may be configured as a mound having a generally rectangular or square shape with curved upper edges as depicted in FIG. 5.

A second cut 132 results in a second volume 133 of material being cut from layer 115 of the upper layer 110 of material. The machine 10 pushes the material and it eventually moves along the upper surface 140 of layer 123 until the machine is stopped with the blade 16 at second dump location 144, which is a second predetermined distance 145 from the first dump location 141 (and further from the end location 128 of the pile 126 of material). The second predetermined distance 145 is greater than the first predetermined distance 142. Upon dumping the load of material and reversing the machine 10, the second load 146 of material is left on the upper surface 140 of layer 123 adjacent the first load 143. Since the second predetermined distance 145 is greater than the first predetermined distance 142, the second load 146 may settle more than the first load 143 so that the upper surface 155 of the second load is closer to the upper surface 140 of layer 123 than the upper surface of the first load 143. The second load 146 of material may also be configured as a mound having a generally rectangular or square shape with curved upper edges but will not be as high or tall as the first load 143 of material.

Similarly, a third cut 134 results in a third volume 135 of material being cut from layer 115 of the upper layer 110 of material. The machine 10 pushes the material along the upper surface 140 of layer 123 until stopping the blade 16 at third dump location 147, which is a third predetermined distance 148 from the second dump location 144. The third predetermined distance 148 is greater than the second predetermined distance 145. Upon dumping the load of material and reversing the machine 10, the third load 149 of material is left on the upper surface 140 of layer 123 adjacent the second load 146. Since the third predetermined distance 148 is greater than the second predetermined distance 145, the third load 149 may settle more than the second load 146 so that the upper surface 155 of the third load is closer to the upper surface 140 of layer 123 than the upper surface of the second load 146. The third load 149 of material may also be configured as a mound having a generally rectangular or square shape with curved upper edges but will not be as high or tall as the second load 146 of material.

Finally, a fourth cut 136 results in a fourth volume 137 of material being cut from layer 115 of the upper layer 110 of material. The machine 10 pushes the material along the upper surface 140 of layer 123 until stopping the blade 16 at fourth dump location 150, which is a fourth predetermined distance 151 from the third dump location 147. The fourth predetermined distance 151 is greater than the third predetermined distance 148. Upon dumping the load of material and reversing the machine 10, the fourth load 152 of material is left on the upper surface 140 of layer 123 adjacent the third load 149. Since the fourth predetermined distance 151 is greater than the third predetermined distance 148, the fourth load 152 may settle more than the third load 149 so that the upper surface 155 of the fourth load is closer to the upper surface 140 of layer 123 than the upper surface of the third load 149. The fourth load 152 of material may also be configured as a mound having a generally rectangular or square shape with curved upper edges but will not be as high or tall as the third load 149 of material.

Each of the loads 143, 146, 149, 152 is sequentially longer along the upper surface 140 the closer the load is to the start location 127. In other words, the distance between dump locations defines a distance between loads or a load spacing distance that increases in size for loads closer to the start location 127. It should be noted that the distance from the end location 128 to the first dump location 141 also defines the load spacing distance of the first load 143.

In general, the amount of material moved by blade 16 during each material moving cycle may be optimized for the operating conditions which results in each material moving cycle moving approximately the same amount of material. As the loads 143, 146, 149, 152 get longer closer to the start location 127, the loads 143, 146, 149, 152 also get shorter (i.e., the upper surface 155 is closer to upper surface 140) the closer each load is to the start location. Based upon the decreasing height of loads 143, 146, 149, 152, the upper surfaces 155 of the loads generally form a sloped surface. By utilizing the planning system 40 to set the locations at which the machine 10 reverses direction along upper surface 140, the upper surface 155 of the loads 143, 146, 149, 152 may be set to generally follow the desired target surface or desired slope 160 that will form the upper surface of the subsequent work surface (i.e., layer 124) upon which the material from layer 116 will be moved during subsequent material moving cycles. In some embodiments, the dump locations of the machine 10 may be set so that the upper surfaces 155 of the loads 143, 146, 149, 152 extend above the desired slope 160 to accommodate the spreading and compaction that may subsequently occur as the machine 10 travels over the upper surfaces. As may be seen in FIGS. 5-6, the desired slope 160 extends at an angle to the upper surface 140 and intersects with the upper surface generally at start location 127.

The planning system 40 may determine the plurality of dump locations in any desired manner. In one example, the planning system may utilize an equation that defines each load spacing distance (D) as:

$$D = x + (N-1) \cdot y \quad (1)$$

where x is a starting distance that is a specified distance between the end location 128 and the first dump location 141, N is a counter for each increment or load, and y is a spacing factor. As an example, the first dump location 141 may be determined by starting at the end location 128 and moving down the upper surface 140 towards the start location 127 by the load spacing distance (D) distance for N=1. The second dump location may be determined by starting at the second dump location 144 and moving down the upper surface 140 towards the start location 127 by the load spacing distance (D) distance for N=2. Either or both of the distance (x) and the spacing factor (y) may be a function of or set based upon the desired angle between the upper surface on which each load is being positioned and the desired slope 160. Other manner of determining the position of each dump location are contemplated.

Figure 7:
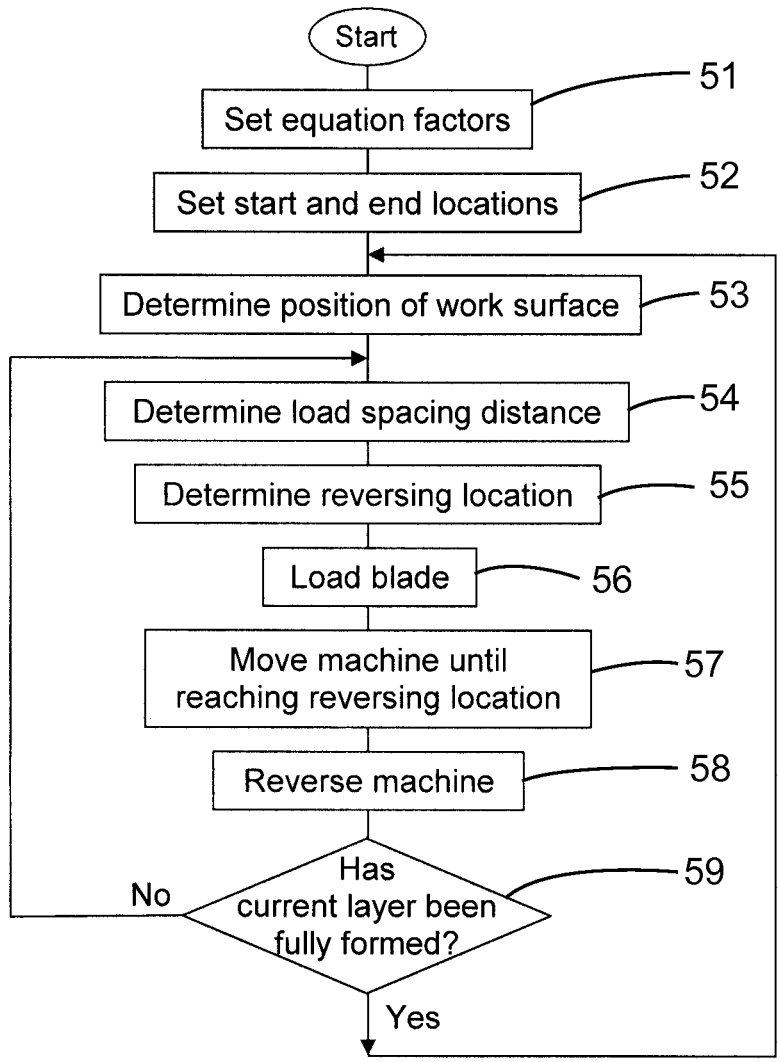
FIG. 7 depicts a flowchart illustrating the dump location planning process in accordance with the disclosure.

The flowchart in FIG. 7 depicts a process in which the planning system 40 may determine the dump locations along a work surface for a specified start location 127 and a specified end location 128. If planning system 40 uses an equation such as Equation (1), factors or constants may be set or stored within controller 36 at stage 51. For example, the distance (x) and the spacing factor (y) may be set at stage 51. In some instances, the angle between the work surface and the desired slope 160 may be set or may be used to determine the distance (x) and the spacing factor (y).

At stage 52, the start location 127 and the end location 128 may be set or stored within controller 36. The position of the work surface may be determined at stage 53. In one example, the controller 36 may receive at data from the position sensor 28 and the controller may determine the position of the machine 10 based upon the data from the position sensor 28. The position of the work surface may be determined based upon the position of the machine and the known dimensions of the machine as it moves along the work surface, such as while moving loads of material at open area 120. In an alternate process, an electronic map of the work site may be generated by a mapping vehicle or other mapping tools.

The planning system 40 may determine at stage 54 the load spacing distance such as through the use of Equation (1). At stage 55, the planning system 40 may determine the dump location based upon the previous dump location, the load spacing distance, and the position of the work surface along which the machine is traveling. At stage 55, the controller 36 may generate commands to load the blade 16 such as by moving the blade along a desired cut. The machine 10 may then be moved along a desired path at stage 57 until reaching the dump location. Once the machine 10 reaches the dump location, the controller 36 may generate a command at stage 58 to dump the material and reverse the machine to leave the load of material at the dump location.

At decision stage 59, the controller 36 may determine whether the layer being formed has been fully formed. If the layer has not been fully formed, the machine 10 may be returned to the area at which the blade will be loaded and stages 53-59 repeated. If the layer has been fully formed, the machine may be returned to the area at which the blade will be loaded and stages 52-59 repeated to create a new layer above the previously created layer.

INDUSTRIAL APPLICABILITY

The industrial applicability of the control system 35 described herein will be readily appreciated from the foregoing discussion. The foregoing discussion is applicable to systems in which a plurality of machines 10 are operated autonomously, semi-autonomously, or manually at a work site 100. Such system may be used at a mining site, a landfill, a quarry, a construction site, a roadwork site, a forest, a farm, or any other area in which movement of material is desired.

Machine 10 may be operative with a planning system 40 of control system 35 and operates to determine dump locations for the machine and thus the blade 16 while creating layers of material that are stacked or rotate about a starting location 127. By generating dump locations that result in progressively longer or wider (i.e., parallel to the work surface) but shorter (i.e., perpendicular to the work surface) loads of material as the dump locations approach the starting location 127, the loads of material may be positioned to more accurately approximate the desired slope of each layer. By creating each new layer with an upper surface that more closely approximates the desired slope, the machine 10 may more easily traverse the work surface that is formed by the new layer of material.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for determining a plurality of dump locations for a blade of a machine, the machine moving on a work surface along a path, comprising:
   a position sensor for generating position signals indicative of a position of the work surface; and
   a controller configured to:
      store a start location of the path;
      store an end location of the path;
      determine the position of the work surface based upon the position signals;
      store a desired target for a subsequent work surface; and
      determine a plurality of dump locations along the path between the start location and the end location based upon the position of the work surface and the desired target, adjacent pairs of dump locations defining a load spacing distance, each load spacing distance being sequentially longer along the work surface closer to the start location.

2. The system of claim 1, further including a machine position sensor for generating machine position signals indicative of a position of the machine, and the controller is configured to determine the position of the machine and determine a position of the blade based upon the position of the machine.

3. The system of claim 2, wherein the controller is further configured to generate commands to move the machine based upon the plurality of dump locations.

4. The system of claim 3, wherein upon moving the machine based upon the commands, a plurality of loads are deposited along the work surface, each of the plurality of loads being sequentially longer along the work surface closer to the start location.

5. The system of claim 4, wherein the each of the plurality of loads being sequentially shorter relative to the work surface closer to the start location.

6. The system of claim 1, wherein the desired target is a desired target surface at an angle to the work surface.

7. The system of claim 6, wherein the angle is entered within the controller.

8. The system of claim 6, wherein the angle is generated by the controller.

9. The system of claim 6, wherein the desired target surface intersects with the work surface.

10. The system of claim 9, wherein the desired target surface intersects with the work surface generally at the start location.

11. The system of claim 6, wherein the desired target surface is generally planar.

12. The system of claim 1, wherein the plurality of dump locations are further determined based upon characteristics of material being moved by the blade.

13. The system of claim 1, wherein the start location is generally adjacent an edge of a material to be mined.

14. A controller-implemented method for determining a plurality of dump locations for a blade of a machine, the machine moving on a work surface along a path, comprising:
   storing a start location of the path;
   storing an end location of the path;
   determining a position of the work surface based upon position signals from a position sensor;
   storing a desired target for a subsequent work surface; and
   determining a plurality of dump locations along the path between the start location and the end location based upon the position of the work surface and the desired target, adjacent pairs of dump locations defining a load spacing distance, each load spacing distance being sequentially longer along the work surface closer to the start location.

15. The method of claim 14, further including determining a position of the machine and determining a position of the blade based upon the position of the machine.

16. The method of claim 15, further including generating commands to move the machine based upon the plurality of dump locations, and depositing a plurality of loads on the work surface, each of the plurality of loads being sequentially longer along the work surface closer to the start location.

17. The method of claim 16, wherein depositing the plurality of loads on the work surface results in each of the plurality of loads being sequentially shorter relative to the work surface closer to the start location.

18. The method of claim 14, wherein the desired target is a desired target surface at an angle to the work surface.

19. The method of claim 14, further including determining the plurality of dump locations based upon characteristics of material being moved by the blade.

20. A machine, comprising:
   a prime mover;
   a blade for engaging a work surface along a path;
   a position sensor for generating position signals indicative of a position of the work surface; and
   a controller configured to:
      store a start location of the path;
      store an end location of the path;
      determine the position of the work surface based upon the position signals;
      store a desired target for a subsequent work surface; and
      determine a plurality of dump locations along the path between the start location and the end location based upon the position of the work surface and the desired target, adjacent pairs of dump locations defining a load spacing distance, each load spacing distance being sequentially longer along the work surface closer to the start location.

* * * * *